(12) United States Patent
Villanueva Lopez et al.

(10) Patent No.: US 10,464,505 B2
(45) Date of Patent: Nov. 5, 2019

(54) CABLE RETENTION MEMBER

(71) Applicant: GM GLOBAL TECHNOLOGY OPERATIONS LLC, Detroit, MI (US)

(72) Inventors: Juan Carlos Villanueva Lopez, Estado de Mexico (MX); Abraham Heriberto Cabrera Garcia, Calimaya Edo (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/788,871

(22) Filed: Oct. 20, 2017

(65) Prior Publication Data
US 2019/0118740 A1 Apr. 25, 2019

(51) Int. Cl.
*F16L 3/13* (2006.01)
*B60R 16/02* (2006.01)
*F16L 3/223* (2006.01)

(52) U.S. Cl.
CPC ............ *B60R 16/0215* (2013.01); *F16L 3/13* (2013.01); *F16L 3/223* (2013.01)

(58) Field of Classification Search
CPC . B60R 16/0215; B60R 16/0207; F16L 3/2235
See application file for complete search history.

(56) References Cited

U.S. PATENT DOCUMENTS

| | | | | |
|---|---|---|---|---|
| 3,565,376 A * | 2/1971 | Homer | ...................... | F16L 3/23 248/68.1 |
| 4,775,121 A * | 10/1988 | Carty | ................... | F16L 3/2235 24/543 |
| 4,799,641 A * | 1/1989 | Koreski | ................. | F16L 3/2235 24/329 |
| 5,172,877 A * | 12/1992 | Hattori | .................... | F16L 3/123 24/535 |
| 5,613,655 A * | 3/1997 | Marion | ................. | F16L 3/2235 24/339 |
| 5,653,411 A * | 8/1997 | Picco | .................... | F16L 3/2235 24/339 |
| 6,565,049 B2 * | 5/2003 | Hahn | .................. | B60R 16/0215 248/68.1 |
| 7,387,282 B2 * | 6/2008 | Kovac | ................. | B60R 16/0215 248/55 |
| 7,507,906 B2 * | 3/2009 | Suzuki | ..................... | H02G 3/32 174/117 F |
| 8,408,501 B2 * | 4/2013 | Noyes | ................... | F16L 3/1025 248/68.1 |
| 8,628,048 B2 * | 1/2014 | Matsushima | ....... | B60R 16/0215 248/71 |
| 8,910,912 B2 * | 12/2014 | Child | .................... | F16L 3/2235 248/73 |
| 8,967,556 B2 * | 3/2015 | Meyers | ................ | F16L 3/2235 248/60 |
| 9,080,698 B2 * | 7/2015 | Fukumoto | ............ | F16L 3/2235 |
| 9,112,341 B2 * | 8/2015 | Eshima | ................... | H02G 3/32 |

(Continued)

*Primary Examiner* — Bradley Duckworth
(74) *Attorney, Agent, or Firm* — Quinn IP Law

(57) ABSTRACT

A cable retention device includes a body having a sloped upper surface contiguous with a lower surface, a retention member having a first end and a second end, the retention member flexibly coupled to the body at the first end, and a plurality of projections extending from the lower surface of the body. The lower surface of the body and the retention member define a plurality of openings and each of the plurality of openings is configured to retain a cable.

14 Claims, 1 Drawing Sheet

(56) References Cited

U.S. PATENT DOCUMENTS

| | | | |
|---|---|---|---|
| 10,050,422 B2* | 8/2018 | Duncan | H02G 3/32 |
| 2008/0093510 A1* | 4/2008 | Oh | F16L 3/2235 |
| | | | 248/63 |
| 2009/0066531 A1* | 3/2009 | Boubtane | F16L 3/2235 |
| | | | 340/687 |
| 2012/0104186 A1* | 5/2012 | Shirey | H02G 3/263 |
| | | | 248/74.1 |
| 2015/0214709 A1* | 7/2015 | Landry | H02G 3/32 |
| | | | 248/74.2 |
| 2017/0113521 A1* | 4/2017 | Endo | B60R 16/0215 |
| 2017/0130873 A1* | 5/2017 | Maggi | F16L 3/1075 |
| 2018/0015894 A1* | 1/2018 | Zaldivar Ortiz | B60R 16/0215 |
| 2018/0029452 A1* | 2/2018 | Shibayama | B60J 5/04 |
| 2018/0175596 A1* | 6/2018 | Sugino | H01B 7/0045 |

* cited by examiner

CABLE RETENTION MEMBER

INTRODUCTION

The present invention relates generally to a molded cable retention member.

Clips are typically used to retain cables and cable harnesses in vehicles. However, the installer typically must install the clips one by one during manufacture of the vehicle component, adding to the time required for assembly. Additionally, each clip typically retains a single diameter cable or cable harness.

SUMMARY

Embodiments according to the present disclosure provide a number of advantages. For example, embodiments according to the present disclosure enable retention of multiple cable, hoses or cable harness diameters within a single clip integrated into the vehicle component.

In one aspect, a vehicle component includes a mounting surface and a cable retention device integral with the mounting surface. The cable retention device includes a body having a surface, a retention member having a first end and a second end, the retention member flexibly coupled to the body at the first end, and at least one projection extending from the surface of the body. The surface of the body and the retention member define a plurality of openings and each of the plurality of openings is configured to retain a cable.

In some aspects, the retention member further includes a curved inner surface extending between the first end and the second end.

In some aspects, the curved inner surface of the retention member includes a plurality of curves that define the plurality of openings.

In some aspects, the body includes a sloped upper surface contiguous with a lower surface and the second end of the retention member extends toward the upper surface of the body and is substantially perpendicular to the curved inner surface.

In some aspects, the cable retention device further includes a first projection and a second projection, wherein the first and second projections and the retention member define three openings, and each of the openings is configured to retain a cable.

In some aspects, a first opening is configured to receive a first cable having a first diameter, a second opening is configured to receive a second cable having a second diameter, and a third opening is configured to receive a third cable having a third diameter, wherein the first diameter is smaller than the second diameter and each of the first and second diameters is smaller than the third diameter.

In some aspects, the retention member and the body define a V shaped opening configured to retain a plurality of cables.

In another aspect, a cable retention device includes a body having a sloped upper surface contiguous with a lower surface, a retention member having a first end and a second end, the retention member flexibly coupled to the body at the first end, and a plurality of projections extending from the lower surface of the body. The lower surface of the body and the retention member define a plurality of openings and each of the plurality of openings is configured to retain a cable.

In some aspects, the retention member further includes a curved inner surface extending between the first end and the second end.

In some aspects, the curved inner surface of the retention member includes a plurality of curves that define the plurality of openings.

In some aspects, the second end of the retention member extends toward the upper surface of the body and is substantially perpendicular to the curved inner surface.

In some aspects, the cable retention device further includes a first projection and a second projection, wherein the first and second projections define three openings, and each of the openings is configured to retain a cable.

In some aspects, a first opening is configured to receive a first cable having a first diameter, a second opening is configured to receive a second cable having a second diameter, and a third opening is configured to receive a third cable having a third diameter, wherein the first diameter is smaller than the second diameter and each of the first and second diameters is smaller than the third diameter.

In some aspects, the retention member and the body define a V shaped opening configured to retain a plurality of cables.

BRIEF DESCRIPTION OF THE DRAWINGS

The present disclosure will be described in conjunction with the following figures, wherein like numerals denote like elements.

Figure 1:
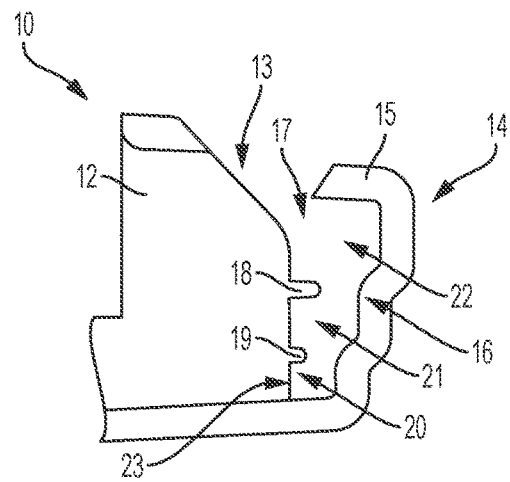
FIG. 1 is a side view of a cable retention member, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The use of multiple clips to retain a cable or wiring harness to a vehicle component increases manufacturing complexity. Embodiments discussed herein include cable retention members integrally formed with the vehicle component, such as, for example and without limitation, a lower grille. Additionally, embodiments of the cable retention member discussed herein retain multiple cables, wires, or harnesses of varying diameters within a single retention member. The term "cable" as used herein is used to refer to one or more cables, sensor wires, or cable or wire harnesses, as understood by one of skill in the art.

FIG. 1 illustrates a side view of a cable retention device 10, according to an embodiment. The cable retention device 10 includes a body 12. The body 12 has a sloped upper surface 13 contiguous with a lower surface 23. A retention member 14 has a first end and a second end. The first end of the retention member 14 is flexibly coupled to the lower surface 23 of the body 12. The second end of the retention member 14 extends inward toward the sloped upper surface 13 to form a lip 15. The surfaces 13, 23 and the retention member 14 define a V-shaped recess 17. The recess 17 is configured to retain a plurality of cables of varying diameters, as discussed in greater detail herein. The lip 15 retains the cable or cables within the V-shaped recess 17 of the cable retention device 10.

The retention member 14 includes a curved inner surface 16. The curved inner surface 16 faces toward the lower surface 23 of the body 12. The curved inner surface 16 includes a plurality of bumps or curves that define separate cable openings, such as the openings 20, 21, 22. In some embodiments, a plurality of projections 18, 19 extend from the lower surface 23 of the body 12 into the recess 17. In some embodiments, each of the projections 18, 19 is aligned with a curved portion of the inner surface 16 of the retention member 14.

Figure 2:
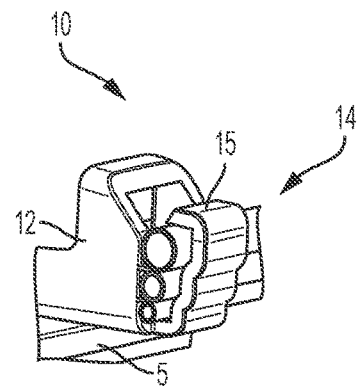
FIG. 2 is a front perspective view of the cable retention member of FIG. 1, according to an embodiment.
Figure 3:
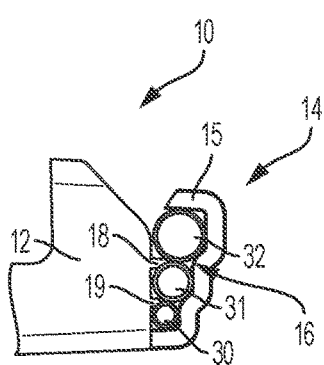
FIG. 3 is a side view of the cable retention member of FIG. 1, according to an embodiment.
Figure 4:
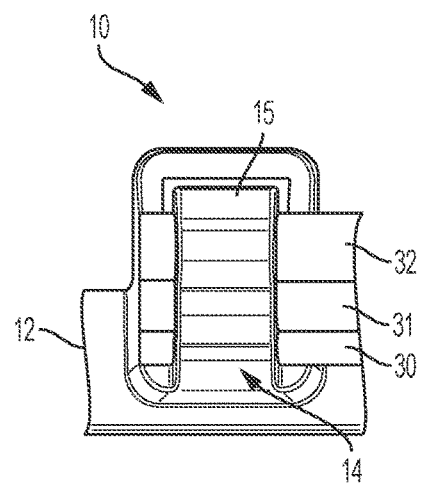
FIG. 4 is a front view of the cable retention member of FIG. 1, according to an embodiment.

FIGS. 2-4 illustrate other views of the cable retention device 10 with a plurality of cables 30, 31, 32 retained within the V-shaped recess 17. As best illustrated in FIGS. 2 and 3, a first opening 20 is sized to retain a cable 30 of a first diameter. A second opening 21 is sized to retain a cable 31 of a second diameter. A third opening 22 is sized to retain a cable 32 of a third diameter. In some embodiments, the openings 20, 21, 22 are vertically oriented such that the diameters of the openings 20, 21, 22 increase in a vertical direction from the first end of the retention member 14 to the second end of the retention member 14. The curved inner surface 16 of the retention member 14 forms a "stair step" pattern in which the openings 20, 21, 22 increase in size from the lower, or first, end of the retention member 14 to the upper, or second, end of the retention member 14. The "accordion" or "stair step" shape of the retention member 14 allows the retention member 14 to securely grip or frictionally retain cables of varying diameters.

In some embodiments, the projections 18, 19 at least partially separate the V-shaped recess 17 into the several openings 20, 21, 22. In some embodiments, the first projection 18 and the second projection 19 have different lengths, that is, the first projection 18 extends further into the recess 17 than the second projection 19. In some embodiments, the first and second projections 18, 19 align with the curved portions of the stair-step shaped inner surface 16 of the retention member 14 to at least partially define the openings 20, 21, 22. In some embodiments, the projections 18, 19 align and at least partially support one or more cables retained within the V-shaped recess 17.

While FIGS. 2-4 illustrate the cable retention device 10 retaining three cables 30, 31, 32 of different diameters, in other embodiments, the cable retention device 10 retains one or more cables of the same diameter. In some embodiments, the cable retention device 10 is configured to retain cables having diameters between approximately 4 mm and approximately 10 mm.

In some embodiments, the cable retention device 10 is integrally formed with a mounting surface 5 of a vehicle component, such as a lower grille. In some embodiments, the cable retention device 10 is formed from a resilient material such as plastic, for example and without limitation.

One or more cables are inserted into the cable retention device 10 by pulling the retention member 14 away from the body 12 from a retention position to an open position. The first end of the retention member 14 is flexibly connected to the body 12 such that after one or more cables are inserted into the V-shaped recess 17, the retention member 14 resiliently returns to the retention position.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skid in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle component, comprising:
    a mounting surface;
    a cable retention device formed as a single unit with the mounting surface, the cable retention device comprising
    a body having a surface;
    a retention member having a first end and a second end, the retention member flexibly coupled to the body at the first end and resiliently returning to a retention position from an open position; and
    at least one projection extending from the surface of the body;
    wherein the surface of the body and the retention member define a plurality of openings and each of the plurality of openings is configured to retain a cable.

2. The vehicle component of claim 1 wherein the retention member further comprises a curved inner surface extending between the first end and the second end.

3. The vehicle component of claim 2, wherein the curved inner surface of the retention member comprises a plurality of curves that define the plurality of openings.

4. The vehicle component of claim 2, wherein the body comprises a sloped upper surface contiguous with a lower surface and the second end of the retention member extends toward the upper surface of the body and is substantially perpendicular to the curved inner surface.

5. The vehicle component of claim 1, wherein the cable retention device further comprises a first projection and a second projection, wherein the first and second projections and the retention member define three openings, and each of the openings is configured to retain a cable.

6. The vehicle component of claim 5, wherein a first opening is configured to receive a first cable having a first diameter, a second opening is configured to receive a second cable having a second diameter, and a third opening is configured to receive a third cable having a third diameter, wherein the first diameter is smaller than the second diameter and each of the first and second diameters is smaller than the third diameter.

7. The vehicle component of claim 1, wherein the retention member and the body define a V shaped opening configured to retain a plurality of cables.

8. A cable retention device, comprising:
    a body having a sloped upper surface contiguous with a lower surface;
    a retention member having a first end and a second end, the retention member flexibly coupled to the body at the first end, and resiliently returning to a retention position from an open position; and
    a plurality of projections extending from the lower surface of the body;
    wherein the lower surface of the body and the retention member define a plurality of openings and each of the plurality of openings is configured to retain a cable.

9. The cable retention device of claim 8, wherein the retention member further comprises a curved inner surface extending between the first end and the second end.

10. The cable retention device of claim 9, wherein the curved inner surface of the retention member comprises a plurality of curves that define the plurality of openings.

11. The cable retention device of claim 8, wherein the second end of the retention member extends toward the upper surface of the body and is substantially perpendicular to the curved inner surface.

12. The cable retention device of claim 8, further comprising a first projection and a second projection, wherein the first and second projections define three openings, and each of the openings is configured to retain a cable.

13. The cable retention device of claim 12, wherein a first opening is configured to receive a first cable having a first diameter, a second opening is configured to receive a second cable having a second diameter, and a third opening is configured to receive a third cable having a third diameter, wherein the first diameter is smaller than the second diameter and each of the first and second diameters is smaller than the third diameter.

14. The cable retention device of claim 8, wherein the retention member and the body define a V shaped opening configured to retain a plurality of cables.

\* \* \* \* \*